July 17, 1962

J. VANDERHOVEN 3,044,446

DRINKING TROUGHS FOR ANIMALS

Filed March 16, 1960

Inventor
JEAN VANDERHOVEN

By Toulmin & Toulmin
Attorneys

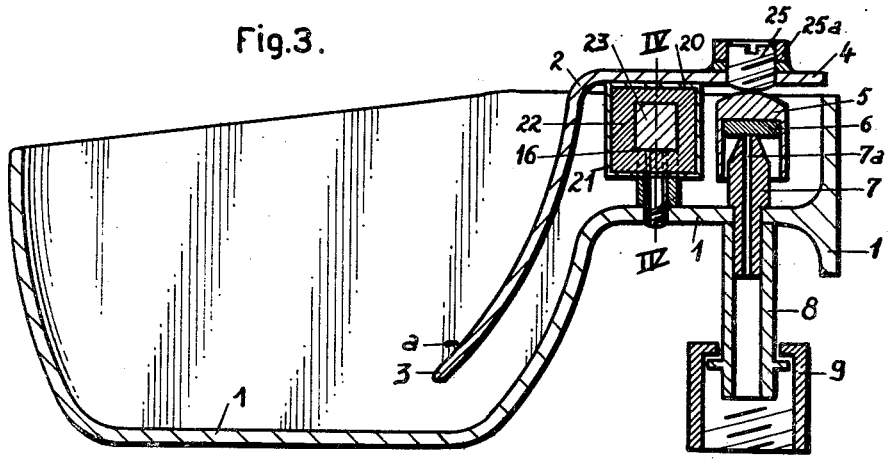
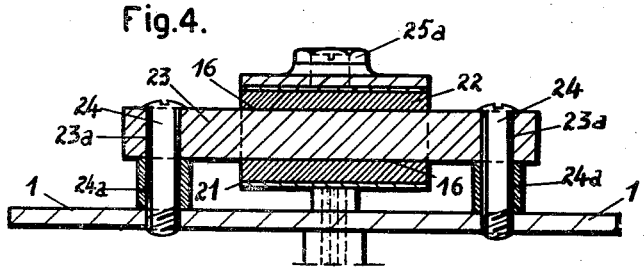
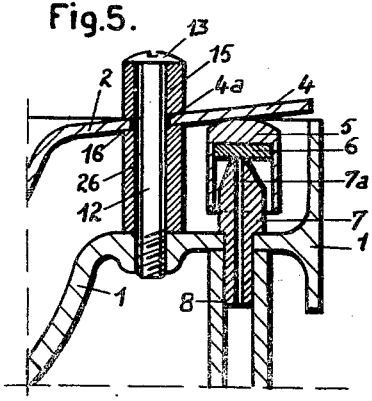 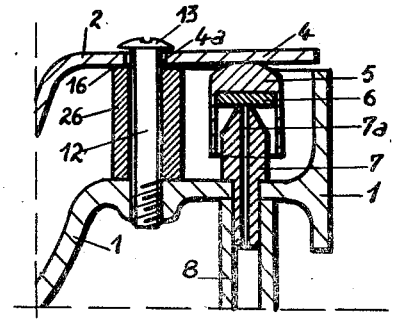

United States Patent Office 3,044,446
Patented July 17, 1962

3,044,446
DRINKING TROUGHS FOR ANIMALS
Jean Vanderhoven, 53 Blvd. Ernest Solvay,
Herstal, Belgium
Filed Mar. 16, 1960, Ser. No. 15,454
Claims priority, application Belgium Mar. 23, 1959
4 Claims. (Cl. 119—75)

This invention relates to drinking troughs for animals and has for its object to provide an improved construction of trough having inlet valve means for the supply of liquid which is operable by an animal using the trough.

According to the present invention, a drinking trough for animals comprises a trough basin, an inlet nozzle for connection to an external liquid supply, a valve for controlling the admittance of liquid into the basin from said nozzle which valve is self-openable under pressure of the supply liquid, a tiltable valve controlling element, and compressible resilient mounting means for said valve controlling element arranged to urge the latter into engagement with, and exert a continuous and controllable pressure upon, said valve whereby the valve is maintained normally closed against the pressure of the supply liquid, opening of the valve for admittance of liquid being effectable through tilting said valve controlling element against the reaction of the compressible resilient mounting means by the application of an external pressure on said element by an animal using the trough. The valve may be in the form of a bell-shaped housing containing a sealing element arranged to fit over and cap the outlet aperture of the inlet nozzle, and said valve controlling element may be in the form of a blade-like two-armed lever having one arm depending into the trough basin for receiving the external tilting pressure from an animal using the trough, the second arm being substantially horizontal, its outer end portion being arranged to lie in contact with the top of the valve housing and its inner end porton being carried by the compressible resilient mounting means.

By way of example, several embodiments of the invention will be more particularly described with reference to the accompanying diagrammatic drawings in which:

FIGURE 3 is a sectional view similar to FIGURE 2 of a modified construction;

FIGURE 4 is a vertical transverse section on line IV—IV of FIGURE 3; and

FIGURES 5 and 6 are fragmentary sectional views showing two further modified arrangements.

Figure 1:
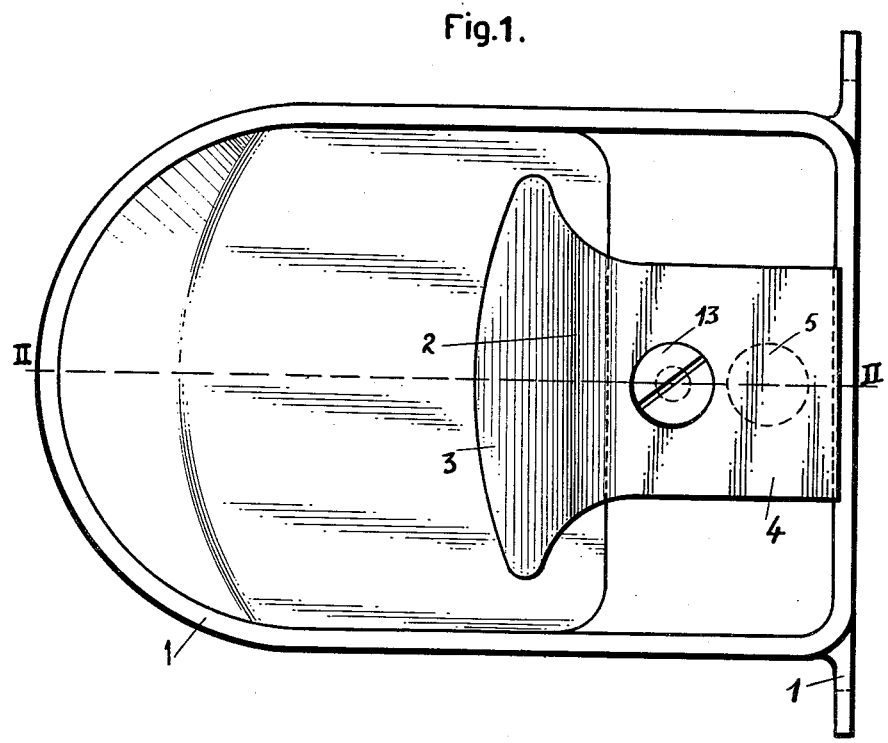
FIGURE 1 is a plan view of a drinking trough for animals according to one embodiment.
Figure 2:
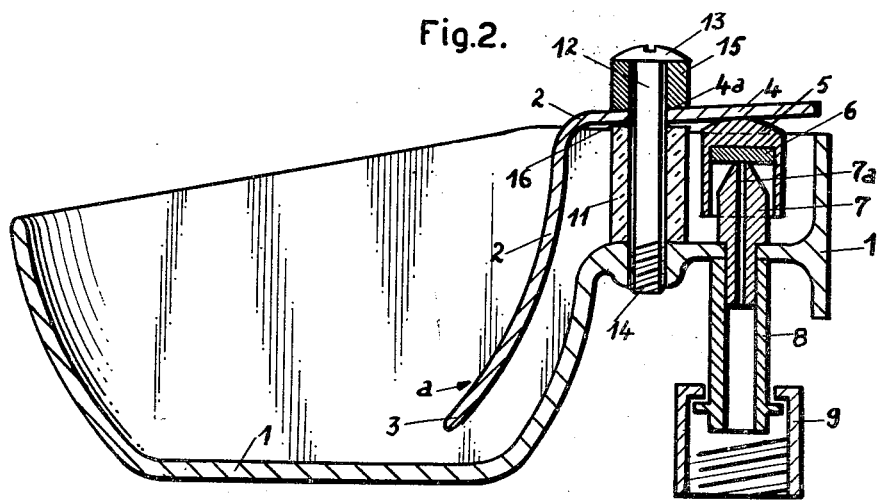
FIGURE 2 is a vertical longitudinal section along line II—II of FIGURE 1.

Referring to FIGURES 1 and 2, 1 represents the basin of the drinking trough, and 2 is an inlet valve operating element in the form of a bent blade-like member having a depending arm 3 and a substantially horizontal arm 4. The arm 3 is intended to be pushed in the direction of the arrow *a* by an animal using the trough, while the rear end portion of the horizontal arm 4 is intended to lie in contact on its undersurface with the upper surface of an inlet valve 5 in the form of a bell-shaped housing provided with a resilient pad or washer 6 capping the outlet aperture 7a of a water inlet nozzle 7. This nozzle 7 passes through the wall of the trough basin 1 and is connected to a short inlet pipe 8 provided at its lower end with a union fitting 9 for coupling to a main water supply conduit (not shown).

Passing through an aperture 4a in the forward end portion of the horizontal arm 4 of the valve operating element 2 is a screw 12 having a head 13 and a threaded end 14 which is engaged in the base wall of the basin 1. The arm 4 is interposed between a lower sleeve 11 of rigid material and an upper resilient sleeve or bush 15 of rubber or similar material, such that the edge 16 of the sleeve 11 forms a fulcrum for pivotal movement of the operating element 2.

In use, when an animal using the trough pushes the arm 3 of the valve operating element 2 in the direction of the arrow *a* shown in FIGURES 1 and 2, the latter tilts about the fulcrum 16, thereby compressing the resilient bush 15 and causing the rear end portion of the arm 4 to move upwards away from the valve 5 which then rises under the water pressure and allows water to flow into the trough. When the animal ceases to push on the element 2, the reaction of the compressed resilient bush 15 returns the operating element 2 to its original position, thereby forcing down the valve 5 and closing the opening 7a of the nozzle 7 so as to cut off the water supply.

In the modified embodiment illustrated in FIGURES 3 and 4, a valve operating element 2 similar to that described in connection with FIGURES 1 and 2 is again provided but it is fixed at 20 to a metal shell 21 containing resilient material 22 bonded to a fixed cross shaft 23. As shown in FIGURE 4, this cross shaft has a square cross-section, although it may have a different form if desired, and it is fixed at opposite ends by two screws 24 and is resiliently supported upon the base wall of the trough basin 1 by bushes 24a of resilient material. The rear end portion of the horizontal arm 4 of the operating element 2 in this modification carries an adjustable control screw 25 the tip of which bears on the valve member 5. A lock-nut 25a maintains the screw 25 in adjusted position.

In use, the effect of an animal pushing in the direction of the arrow *a* on the arm 3 of the operating element 2, is to cause the latter to tilt thereby enabling the valve 5 to rise and admit water as previously described, but in this case the tilting of the element 2 sets up a torsional stress in the resilient material 22 which serves to restore the element 2 to its original position when the pressure on the arm 3 is released. Control of the pressure exerted on the valve 5 and ease of operation of the element 2 can be obtained by adjusting the screws 24 so as to alter the degree of compresison of the resilient bushes 24a.

The embodiments illustrated in FIGURES 5 and 6 are similar to the first-described embodiment but in comparison with FIGURE 2, the rigid sleeve 11 is replaced by a sleeve 26 of compressible resilient material. In FIGURE 5, the other parts including the resilient bush 15 under the head 13 of the screw 12 correspond to the parts described in connection with FIGURE 2. The form of FIGURE 6 is similar except for the fact that the resilient bush 15 is omitted, the head 13 of the screw 12 acting directly on the upper surface of the arm 4 of the operating element 2.

The operation of the embodiments of FIGURES 5 and 6 is also similar to that of the first-described embodiment, the edge 16 of the sleeve 26 again forming a fulcrum during tilting of the element 2, but in these cases the resilient sleeve 26 is also compressed during the tilting movement. As is evident from the omission of the resilient bush 15 in the form of FIGURE 6, the compression of the resilient sleeve may in fact be relied upon to return the operating element 2 to its original position upon release of pressure by the animal on the arm 3. Adjustment of the screw 12 again enables the pressure exerted on the valve 5 to be readily controlled.

In each of the embodiments of FIGURES 1 and 2, FIGURE 5 and FIGURE 6, a single fixing screw 12 is shown disposed in the median plane of drinking trough, but in alternative arrangements a pair of fixing screws symmetrically positioned on either side of this median plane may be used.

The particular materials used for making the trough are, of course, a matter of choice, the scope of the present invention being defined by the appended claims.

Advantages of the drinking troughs hereinabove described in accordance with the invention include the absence of noise in operation, ease of operation and adjustment, and ease of manufacture.

What I claim is:

1. An automatic drinking trough for animals comprising a trough basin having a head portion with a threaded opening therein, an inlet nozzle for connection to an external liquid supply, said inlet nozzle being disposed in said head portion of said basin, an inlet valve capping said inlet nozzle, said valve being self-openable under pressure of the supply liquid, a tiltable valve controlling element, one end thereof being in engagement with the top of said valve and the other end thereof extending into said basin and constituting an animal operating portion to be actuated by the mouth of a drinking animal, and compressible resilient mounting means in contact with said valve controlling element, said mounting means comprising a screw fitting into said threaded opening and sleeve means surrounding the shank of said screw and supporting under compression said valve controlling element so as to return it to its normal position after its actuation causing pressure on said valve and therewith a flow of water into said basin, said screw further being adjustable relative to said resilient mounting means whereby the degree of compression of said sleeve means and the force exerted on the valve controlling element can be varied.

2. An automatic drinking trough for animals as claimed in claim 1 wherein said sleeve means comprise a rigid portion underneath said valve controlling element forming a fulcrum therefor and a compressible resilient portion above said valve controlling element.

3. An automatic drinking trough for animals as claimed in claim 1, wherein said sleeve means comprise a compressible resilient portion underneath and above said valve controlling element, the lower portion forming a fulcrum for said valve controlling element.

4. An automatic drinking trough for animals as claimed in claim 1, wherein said sleeve means comprise a compressible resilient portion underneath said valve controlling element forming a fulcrum therefor.

References Cited in the file of this patent

UNITED STATES PATENTS

| | | |
|---|---|---|
| 269,531 | McGinley | Dec. 26, 1882 |
| 957,347 | Kennedy | May 10, 1910 |
| 1,314,160 | Stengel | Aug. 26, 1919 |
| 1,549,021 | Olson | Aug. 11, 1925 |
| 2,270,838 | Langdon | Jan. 20, 1942 |
| 2,754,838 | Gates et al. | July 17, 1956 |

FOREIGN PATENTS

| | | |
|---|---|---|
| 22,661 | Great Britain | Nov. 9, 1901 |
| 886,399 | Germany | Aug. 13, 1953 |